Jan 6, 1931. G. BOULET 1,787,717
VALVE GEAR FOR INTERNAL COMBUSTION ENGINES
Filed March 6, 1930

Georges Boulet
INVENTOR;
By [signature]
his Attorney.

Patented Jan. 6, 1931

1,787,717

UNITED STATES PATENT OFFICE

GEORGES BOULET, OF SEVRES, FRANCE

VALVE GEAR FOR INTERNAL-COMBUSTION ENGINES

Application filed March 6, 1930, Serial No. 433,581, and in France March 30, 1929.

The present invention relates to valve gears for internal combustion engines of the four-stroke type, and it has for its object to devise an arrangement providing for a variable admission of combustible mixture, and also the partial admission of exhaust gas into the cylinder during the periods of reduced admission; such an arrangement is chiefly applicable to aviation engines, whose operating conditions vary with the altitude.

More specifically, the invention has for its object to provide a double valve control, each control member acting upon a distinct admission valve and/or a distinct exhaust valve, and is adapted to assume variable positions with reference to the actuating member therefor.

An embodiment of the invention is fully described in the following description, with reference to the accompanying drawings, which are given by way of example, and in which.

Figure 1:
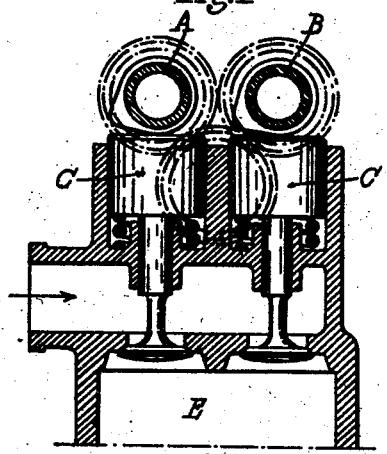
Fig. 1 is a vertical section through both admission valves of a cylinder of a four-stroke engine.
Figure 2:
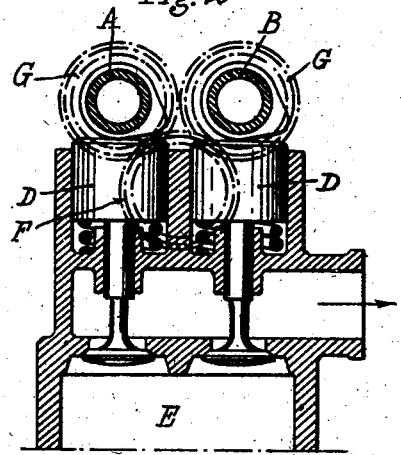
Fig. 2 is a vertical section through the exhaust valves.
Figure 3:
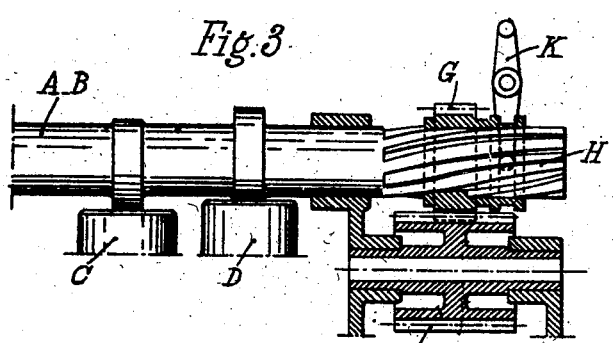
Fig. 3 is a sectional elevation of the control means with variable angular setting.

Referring to the drawing, A and B are two distinct camshafts, C, C are admission valves (Fig. 1), D, D are exhaust valves (Fig. 2); each shaft A, B controls a respective admission valve C and a respective exhaust valve D (Fig. 3). E is the engine cylinder. F is a driving pinion keyed to the driving shaft and engaging driven pinions G, having helical internal flutes, co-operating with corresponding helical flutes of the camshafts A—B respectively. K denotes one of the forks adapted to slide the pinions G along the fluted portions of camshafts A, B.

The operation is as follows:

The oscillation of each fork K causes a translation of the corresponding pinion G and imparts to the corresponding camshaft A or B a movement of rotation with reference to pinion F, due to the helical flutes H.

Figure 4:
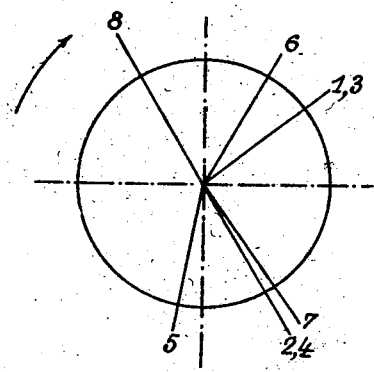
Fig. 4 is a diagram illustrating the operation of the engine when running at reduced admission with partial admission of exhaust gas.

Since the motions of camshafts A and B are distinct from each other, and take place in reverse directions, the following results may be obtained:

(a) an admission limited to ½ stroke of the piston (Fig. 4); both admission valves C open at the same instant at 1, 3 and close at the same instant at 2, 4: this reduced admission may be combined with a partial exhaust, that is, with a partial admission of exhaust gas during a short period in the admission stroke, by delaying the closure of valve D by shaft A; thus, one valve D opens at 5 and closes at 6, beyond the upper dead centre, whilst the other valve D controlled by shaft B opens at 7 and closes at 8.

Figure 5:
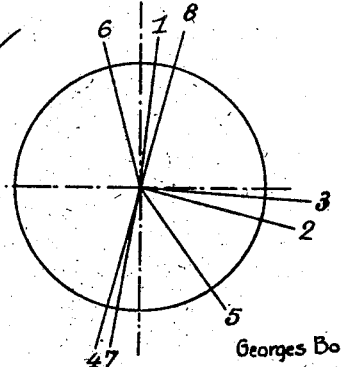
Fig. 5 is a diagram illustrating the operation of the engine when running at full admission and exhaust.

(b) a complete admission for one stroke of the piston (Fig. 5), in which case the admission valve C of shaft A opens at 1 and closes at 2, whilst the valve C of shaft B opens at 3 and closes at 4; this is combined with a complete exhaust of the engine by the two valves D, the valve of shaft A opening at 5 and closing at 6, and the valve of shaft B opening at 7 and closing at 8, as usual.

(c) all intermediate positions, for intermediate adjustments of fork K.

In this manner, the present invention provides for a reduced admission or under-feeding, with an optional admission of exhaust gas, as well as full admission, by manual or automatic control, of a greater or less amount of combustible mixture, thus obtaining a constant power irrespectively of the altitude.

Obviously, the invention is not limited to the form of construction herein described and represented, which is susceptible of numerous modifications in detail, without departing from the principle of the invention.

The invention also contemplates the case where only one of the camshafts has a variable angular setting. Each camshaft may act upon one valve only, which, in the case of four valves, i. e. two valves C and two valves D, would require four camshafts, or, in the case of three valves, i. e. two valves C and one valve D for instance, would require three camshafts.

The construction of the mechanism for the angular adjustment of the camshafts may be different from the above, and in particular, the flutes H may be rectilinear, whereby the pinions F and G would have helical teeth.

Having now described my invention what I claim as new and desire to secure by Letters Patent is:

In a valve gear, two admission valves, two exhaust valves, two camshafts, each coacting with one admission valve and one exhaust valve, control means for said camshafts and means for angularly displacing said camshafts in reverse directions, with respect to said control means, whereby one exhaust valve closes materially beyond the upper dead centre and both admission valves open considerably beyond the upper dead centre in one angular setting of said camshafts.

In testimony whereof I have signed my name to this specification.

GEORGES BOULET.